US010780706B2

(12) United States Patent
Shiomoto et al.

(10) Patent No.: US 10,780,706 B2
(45) Date of Patent: Sep. 22, 2020

(54) DISCHARGING DEVICE AND DISCHARGING METHOD

(71) Applicants: Shusaku Shiomoto, Kanagawa (JP); Manabu Seo, Kanagawa (JP); Ikuo Katoh, Kanagawa (JP); Waka Lin, Tokyo (JP)

(72) Inventors: Shusaku Shiomoto, Kanagawa (JP); Manabu Seo, Kanagawa (JP); Ikuo Katoh, Kanagawa (JP); Waka Lin, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 43 days.

(21) Appl. No.: 16/299,181

(22) Filed: Mar. 12, 2019

(65) Prior Publication Data

US 2019/0283444 A1 Sep. 19, 2019

(30) Foreign Application Priority Data

Mar. 16, 2018 (JP) .................................. 2018-050034
Jan. 30, 2019 (JP) .................................. 2019-014365

(51) Int. Cl.
*G01N 15/06* (2006.01)
*B41J 2/195* (2006.01)

(52) U.S. Cl.
CPC .............. *B41J 2/195* (2013.01); *G01N 15/06* (2013.01); *G01N 2015/0693* (2013.01)

(58) Field of Classification Search
CPC .......... G01N 15/06; G01N 2015/0693; G01N 15/1459; G01N 15/1484; G01N 2015/149;

(Continued)

(56) References Cited

U.S. PATENT DOCUMENTS 3,826,364 A * 7/1974 Bonner ................. B07C 5/3425
209/3.1
2011/0245097 A1 10/2011 Rissin et al.
(Continued)

FOREIGN PATENT DOCUMENTS

JP 2008-249446 10/2008
JP 5363663 9/2013
(Continued)

*Primary Examiner* — David P Porta
*Assistant Examiner* — Fani Boosalis
(74) *Attorney, Agent, or Firm* — Oblon, McClelland, Maier & Neustadt, L.L.P.

(57) ABSTRACT

Provided is discharging device including liquid droplet discharging unit configured to discharge liquid droplet containing a light-emitting particle that undergoes luminescence in response to irradiation of light, light irradiating unit configured to irradiate liquid droplet discharged by liquid droplet discharging unit with the light, light detecting unit configured to detect luminescence by light-emitting particle contained in liquid droplet in response to irradiation of the light emitted by light irradiating unit, and average particle number calculating unit configured to determine presence/absence of light-emitting particle in liquid droplet based on whether light detecting unit has detected luminescence by light-emitting particle, and calculate average particle number, which is average, among all liquid droplets discharged, in number of light-emitting particles contained per liquid droplet, based on ratio of liquid droplets containing no light-emitting particle relative to all the liquid droplets discharged, the ratio being calculated based on the presence/absence of light-emitting particle.

14 Claims, 10 Drawing Sheets

(58) Field of Classification Search
CPC .. G01N 15/14; G01N 15/1463; G01N 1/2202; G01N 1/44; B41J 2/195; C12Q 1/68
See application file for complete search history.

(56) References Cited

U.S. PATENT DOCUMENTS

| | | | |
|---|---|---|---|
| 2014/0179023 A1* | 6/2014 | Nishikawa | C12Q 1/6825 436/501 |
| 2017/0120604 A1 | 5/2017 | Seo et al. | |
| 2018/0340880 A1 | 11/2018 | Matsumoto et al. | |
| 2019/0025185 A1* | 1/2019 | Katoh | B01L 3/0268 |

FOREIGN PATENT DOCUMENTS

| | | |
|---|---|---|
| JP | 5816237 | 10/2015 |
| JP | 2015-203654 | 11/2015 |
| JP | 2017-083439 | 5/2017 |
| JP | 2017-209103 | 11/2017 |
| JP | 2018-009956 | 1/2018 |
| JP | 2018-017700 | 2/2018 |
| JP | 2019-023629 | 2/2019 |

* cited by examiner

DISCHARGING DEVICE AND DISCHARGING METHOD

CROSS-REFERENCE TO RELATED APPLICATIONS

The present application claims priority under 35 U.S.C. § 119 to Japanese Patent Application No. 2018-050034 filed Mar. 16, 2018 and Japanese Patent Application No. 2019-014365 filed Jan. 30, 2019. The contents of which are incorporated herein by reference in their entirety.

BACKGROUND OF THE INVENTION

Field of the Invention

The present disclosure relates to a discharging device and a discharging method.

Description of the Related Art

For example, in evaluation of medicinal efficacy and toxicity of drugs using cells, it has been known that cells develop resistance to reagents differently depending on the environment surrounding the cells. Hence, when producing a plurality of cell samples to be used for evaluation tests, what matters significantly is to make the number of cells to be contained in the samples uniform.

As the method for dispensing cells by a prescribed number, there have been known a method of weighing out cells one by one from a thin cell suspension using a cell sorter while counting the number of cells visually, and a method of counting the number of cells in a liquid droplet discharged from a cell suspension based on a captured image of the liquid droplet (for example, see Japanese Unexamined Patent Application Publication No. 2018-17700).

However, in dispensing 1,000 or more cells for evaluation of medicinal efficacy and toxicity, the dispensing method using a thin cell suspension is problematic in that an enormous amount of time is needed for producing samples in a large quantity, and in that the liquid amount is excessive relative to the cells in the samples produced. Further, the method using image capturing is problematic in that a large-scaled device and complicated image analyses are needed.

SUMMARY OF THE INVENTION

According to one aspect of the present disclosure, a discharging device includes a liquid droplet discharging unit configured to discharge a liquid droplet containing a light-emitting particle that undergoes luminescence in response to irradiation of light, a light irradiating unit configured to irradiate the liquid droplet discharged by the liquid droplet discharging unit with the light, a light detecting unit configured to detect the luminescence by the light-emitting particle contained in the liquid droplet in response to irradiation of the light emitted by the light irradiating unit, and an average particle number calculating unit configured to determine presence or absence of the light-emitting particle in the liquid droplet based on whether the light detecting unit has detected the luminescence by the light-emitting particle, and calculate an average particle number, which is an average, among all liquid droplets discharged, in number of light-emitting particles contained per the liquid droplet, based on a ratio of liquid droplets containing no light-emitting particle relative to all the liquid droplets discharged, the ratio being calculated based on the presence or absence of the light-emitting particle.

DESCRIPTION OF THE EMBODIMENTS

Figure 1:
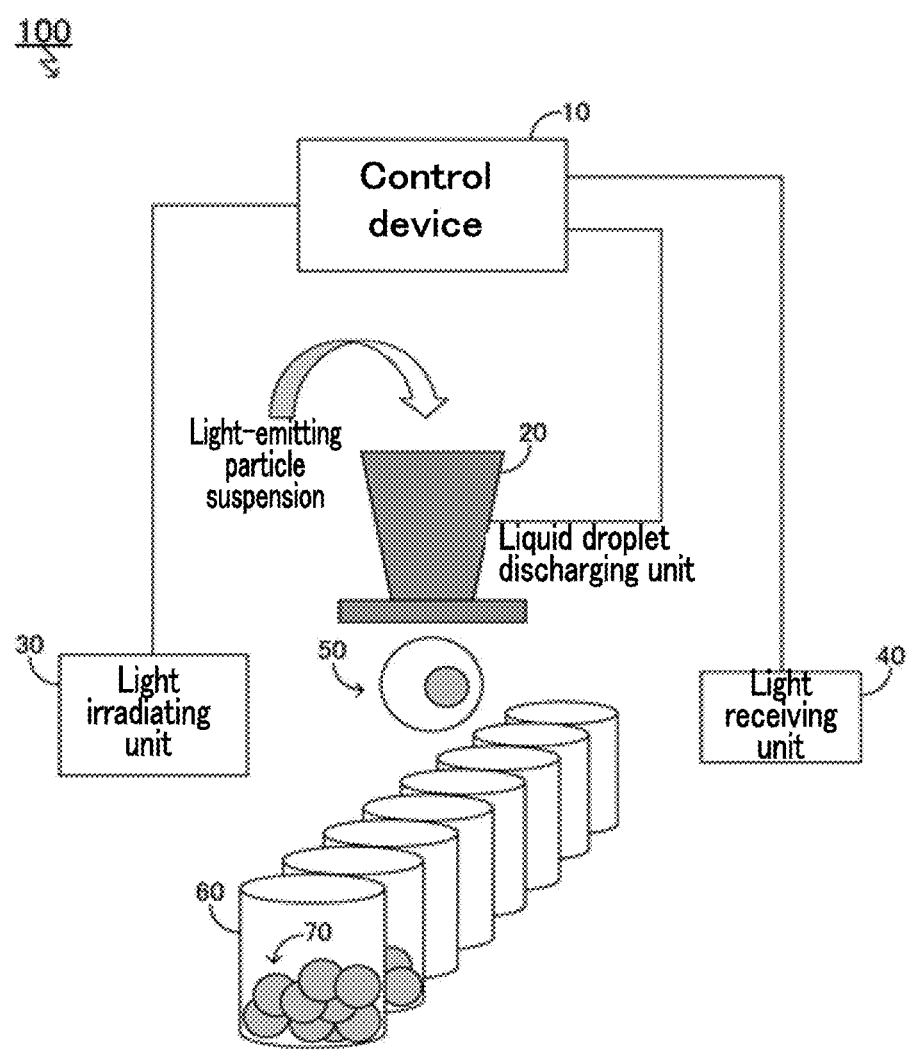
FIG. 1 is an exemplary diagram illustrating an example of a discharging device of the present disclosure.

A discharging device of the present disclosure includes a liquid droplet discharging unit configured to discharge a liquid droplet containing a light-emitting particle that undergoes luminescence in response to irradiation of light, a light irradiating unit configured to irradiate the liquid droplet discharged by the liquid droplet discharging unit with the light, a light detecting unit configured to detect the luminescence by the light-emitting particle contained in the liquid droplet in response to irradiation of the light emitted by the light irradiating unit, and an average particle number calculating unit configured to determine presence or absence of the light-emitting particle in the liquid droplet based on whether the light detecting unit has detected the luminescence by the light-emitting particle, and calculate an average particle number, which is an average, among all liquid droplets discharged, in number of light-emitting particles contained per the liquid droplet, based on a ratio of liquid droplets containing no light-emitting particle relative to all the liquid droplets discharged, the ratio being calculated based on the presence or absence of the light-emitting particle, and further includes other units as needed.

A discharging method of the present disclosure includes a liquid droplet discharging step of discharging a liquid droplet containing a light-emitting particle that undergoes luminescence in response to irradiation of light, a light irradiating step of irradiating the liquid droplet discharged in the liquid droplet discharging step with the light, a light detecting step of detecting luminescence by the light-emitting particle contained in the liquid droplet in response to irradiation of the light in the light irradiating step, and an average particle number calculating step of determining presence or absence of the light-emitting particle in the liquid droplet based on whether the luminescence by the light-emitting particle has been detected in the light detecting step, and calculating an average particle number, which is an average, among all liquid droplets discharged, in number of light-emitting particles contained per the liquid droplet, based on a ratio of liquid droplets containing no light-emitting particle relative to all the liquid droplets discharged, the ratio being calculated based on the presence or absence of the light-emitting particle, and further includes other steps as needed.

The discharging method of the present disclosure can be suitably performed by the discharging device of the present disclosure. The liquid droplet discharging step can be suitably performed by the liquid droplet discharging unit. The light irradiating step can be suitably performed by the light irradiating unit. The light detecting step can be suitably performed by the light detecting unit. The average particle number calculating step can be suitably performed by the average particle number calculating unit.

The present disclosure is based on a finding that existing discharging devices may take a long time to produce a sample and count the number of particles, and may need a liquid in a large amount for producing a sample.

Existing discharging devices employing image analyses are configured to count the number of particles in a liquid droplet per liquid droplet based on an image captured with a camera configured to capture images of liquid droplets. Hence, existing discharging devices may take time to capture data of the captured images and analyze the captured images. Furthermore, existing discharging devices may have difficulty determining the number of particles contained in a liquid droplet when a plurality of particles are contained in the liquid droplet. Hence, there may be a need for using a thin particle suspension, and a long time may be taken to produce a sample that needs to contain many particles. Moreover, along with the need for using a thin particle suspension, existing discharging devices need a liquid in a large amount for producing samples, which may lead to excessive use of a liquid.

On the other hand, the discharging device of the present disclosure includes a liquid droplet discharging unit configured to discharge a liquid droplet containing a light-emitting particle that undergoes luminescence in response to irradiation of light, a light irradiating unit configured to irradiate the liquid droplet discharged by the liquid droplet discharging unit with the light, a light detecting unit configured to detect luminescence by the light-emitting particle contained in the liquid droplet in response to irradiation of the light emitted by the light irradiating unit, and an average particle number calculating unit configured to determine presence or absence of the light-emitting particle in the liquid droplet based on whether the light detecting unit has detected the luminescence by the light-emitting particle, and calculate an average particle number, which is an average, among all liquid droplets discharged, in number of light-emitting particles contained per the liquid droplet, based on a ratio of liquid droplets containing no light-emitting particle relative to all the liquid droplets discharged, the ratio being calculated based on the presence or absence of the light-emitting particle.

Hence, the discharging device of the present disclosure needs not produce a thin sample, and can hence save the time needed for sample production and can save the amount of the liquid needed for sample production and suppress excessive use of the liquid as well. Further, unlike the existing discharging devices employing image analyses, the discharging device of the present disclosure needs not indispensably include a camera for capturing images of liquid droplets or computers for performing complicated image processing. Therefore, the discharging device of the present disclosure can be prevented from being a complicated structure, but can be compact. That is, the discharging device of the present disclosure can save the amount of the liquid needed for suspending particles, and can calculate the number of particles contained in a liquid droplet discharged, without performing complicated image processing.

Here, an example of differences between the discharging device according to an embodiment of the present disclosure and existing discharging devices employing image analyses such as a technique of counting the number of cells in a liquid droplet based on a captured image of the liquid droplet is presented in Table 1 below.

TABLE 1

|  | Embodiment of present disclosure | Devices employing image analyses |
| --- | --- | --- |
| Time needed for sample production | Short | Long |
| Amount of liquid needed for sample production | Low | High |
| Size and complexity of device | Small/simple | Large/complicated |

As described above, the discharging device of the present disclosure can solve the various problems of existing discharging devices and achieve an object of the present disclosure.

The present disclosure has an object to provide a discharging device that can save the amount of a liquid needed for suspending particles and can calculate the number of particles contained in a liquid droplet discharged, without performing complicated image processing.

The present disclosure can provide a discharging device that can save the amount of a liquid needed for suspending particles and can calculate the number of particles contained in a liquid droplet discharged, without performing complicated image processing.

The present disclosure will be described by way of embodiment. However, the present disclosure should not be construed as being limited to the embodiment described below. The same components will be denoted by the same reference numerals throughout the drawings to be referred to in the following description. Redundant description about the same components may be appropriately skipped.

FIG. 1 is an exemplary diagram illustrating a configuration of a discharging device 100 according to an embodiment of the present disclosure. The discharging device 100 according to the present embodiment is a device configured to dispense particles by a prescribed number into a container 60 from a suspension of light-emitting particles. The discharging device 100 includes a control device 10, a liquid droplet discharging unit 20, a light irradiating unit 30, and a light receiving unit 40. Here, what is pertinent as the container 60 is a well of a microwell plate.

Figure 12:
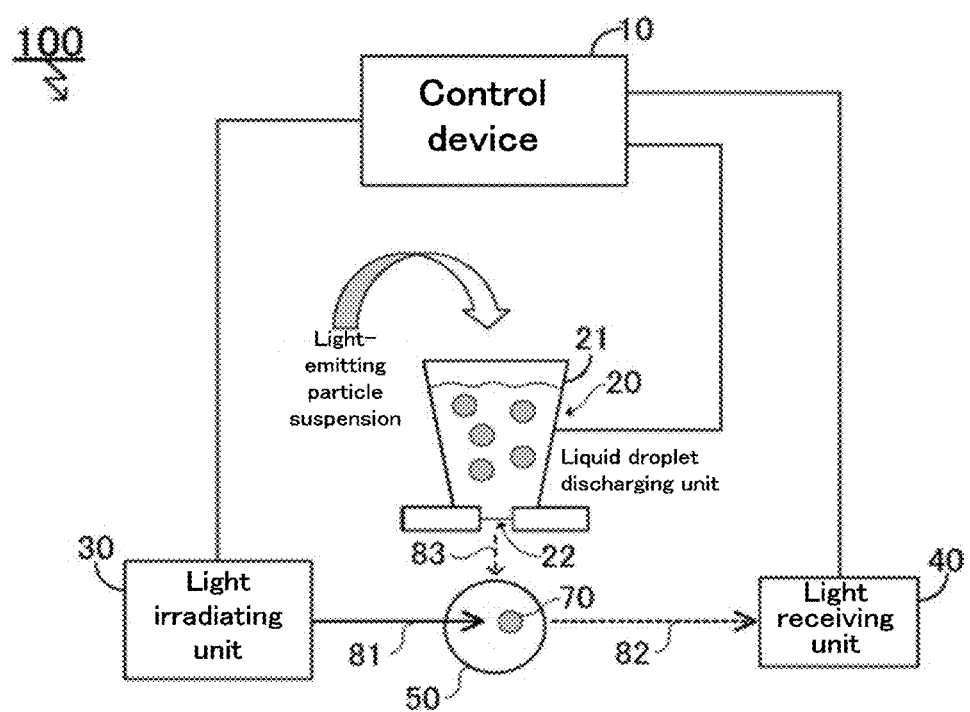
FIG. 12 is an exemplary diagram illustrating an example of a discharging device according to an embodiment of the present disclosure.

FIG. 12 is an exemplary diagram illustrating an example of the discharging device 100 according to an embodiment of the present disclosure. The discharging device 100 will be described in detail with reference to FIG. 12.

In FIG. 12, the reference numeral denotes a control device, the reference numeral 20 denotes a liquid droplet discharging unit, the reference numeral 21 denotes a liquid chamber of a liquid droplet discharging unit 20, the reference numeral 22 denotes a nozzle of the liquid droplet discharging unit, the reference numeral 30 denotes a light irradiating unit, the reference numeral 40 denotes a light receiving unit, and the reference numeral 50 denotes a liquid droplet discharged through the nozzle 22 of the liquid droplet discharging unit. In FIG. 12, the reference numeral 70 denotes a light-emitting particle that undergoes luminescence in response to irradiation of light, the reference numeral 81 denotes an arrow indicating laser light, the reference numeral 82 denotes an arrow indicating light toward the light receiving unit 40, and the reference numeral 83 denotes an arrow indicating a liquid droplet discharging direction. The light receiving unit 40 is coupled to the control device 10.

As illustrated in FIG. 12, the liquid droplet discharging unit 20 includes the liquid chamber 21 in which a particle suspension suspending light-emitting particles 70 is contained, and by deforming a piezoelectric element disposed in the liquid chamber 21, can discharge a spherical, or elliptic, or slightly deformed spherical, or slightly deformed elliptic liquid droplet 50 containing a particle 70 in the direction of the arrow 83 indicating the discharging direction.

The liquid droplet discharging unit 20 is a unit configured to discharge a liquid droplet 50 containing a light-emitting particle 70.

The liquid droplet discharging unit 20 is not particularly limited and may be appropriately selected depending on the intended purpose. Examples of the liquid droplet discharging unit 20 include inkjet heads of, for example, a piezoelectric pressure applying type using a piezoelectric element, a thermal type using a heater, an electrostatic type configured to guide a liquid by an electrostatic attractive force, and a membrane vibration type using a piezoelectric element, and a cell sorter. Among these liquid droplet discharging units, an inkjet head of a membrane vibration type is preferable as the inkjet head. An inkjet head of a membrane vibration type is a type configured to discharge a liquid droplet by an inertial force due to vibration, and can be atmospherically exposed at the top of the inkjet head. Therefore, particularly when particles are cells, it is possible to suppress damages such as heat, electric field, and pressure on cells.

The piezoelectric element used in the inkjet head of the membrane vibration type is not particularly limited and may be appropriately selected depending on the intended purpose. For example, an element using lead titanate zirconate (PZT) is preferable.

The liquid chamber 21 is a liquid retaining section configured to retain a particle suspension suspending the light-emitting particles 70, and a nozzle 22, which is a through hole, is formed in the lower surface of the liquid chamber 21. The liquid chamber 21 may be formed of, for example, metal, silicone, or ceramic. The control device 10 is electrically coupled to the piezoelectric element of the liquid droplet discharging unit 20, and is configured to apply a driving voltage to the piezoelectric element and deform the piezoelectric element to discharge a liquid droplet 50 containing a light-emitting particle 70 in the direction of the arrow 83 indicating the discharging direction.

Examples of the light-emitting particle 70 include a particle that can undergo fluorescence in response to receiving illumination light (hereinafter, may also be referred to as "fluorescent particle"). Examples of the fluorescent particle include an inorganic particle stained with a fluorescent dye, an organic polymer particle stained with a fluorescent dye, a cell stained with a fluorescent dye, and a fluorescent protein. A particle that can undergo luminescence by Raman scattering instead of luminescence by fluorescence may also be used.

The organic polymer particle stained with a fluorescent dye is not particularly limited and may be appropriately selected depending on the intended purpose. Examples of the organic polymer particle stained with a fluorescent dye include SPHERO FLUORESCENT NILERED PARTICLES (available from Bay bioscience Inc., 1% (w/v), with a diameter of from 10 micrometers through 14 micrometers).

The cell of the cell stained with a fluorescent dye is not particularly limited and may be appropriately selected depending on the intended purpose. All kinds of cells can be used regardless of whether the cells are, for example, eukaryotic cells, prokaryotic cells, multicellular organism cells, and unicellular organism cells. One of these kinds of cells may be used alone or two or more of these kinds of cells may be used in combination.

The eukaryotic cells are not particularly limited and may be appropriately selected depending on the intended purpose. Examples of the eukaryotic cells include animal cells, insect cells, plant cells, fungi, algae, and protozoans. One of these kinds of eukaryotic cells may be used alone or two or more of these kinds of eukaryotic cells may be used in combination. Among these eukaryotic cells, animal cells and fungi are preferable.

Adherent cells may be primary cells directly taken from tissues or organs, or may be cells obtained by passaging primary cells directly taken from tissues or organs a few times. Adherent cells may be appropriately selected depending on the intended purpose. Examples of adherent cells include differentiated cells and undifferentiated cells.

Differentiated cells are not particularly limited and may be appropriately selected depending on the intended purpose. Examples of differentiated cells include: hepatocytes, which are parenchymal cells of a liver; stellate cells; Kupffer cells; endothelial cells such as vascular endothelial cells, sinusoidal endothelial cells, and corneal endothelial cells; fibroblasts; osteoblasts; osteoclasts; periodontal ligament-derived cells; epidermal cells such as epidermal keratinocytes; epithelial cells such as tracheal epithelial cells, intestinal epithelial cells, cervical epithelial cells, and corneal epithelial cells; mammary glandular cells; pericytes; muscle cells such as smooth muscle cells and myocardial cells; renal cells; pancreatic islet cells; nerve cells such as peripheral nerve cells and optic nerve cells; chondrocytes; and bone cells.

Undifferentiated cells are not particularly limited and may be appropriately selected depending on the intended purpose. Examples of undifferentiated cells include: pluripotent stem cells such as embryotic stem cells, which are undifferentiated cells, and mesenchymal stem cells having pluripotency; unipotent stem cells such as vascular endothelial progenitor cells having unipotency; and iPS cells.

Fungi are not particularly limited and may be appropriately selected depending on the intended purpose. Examples of fungi include molds and yeast fungi. One of these kinds of fungi may be used alone or two or more of these kinds of fungi may be used in combination. Among these kinds of fungi, yeast fungi are preferable because the cell cycles are adjustable and monoploids can be used. The cell cycle means a cell proliferation process in which cells undergo cell division and cells (daughter cells) generated by the cell division become cells (mother cells) that undergo another cell division to generate new daughter cells.

Yeast fungi are not particularly limited and may be appropriately selected depending on the intended purpose. For example, as yeast fungi, Bar1-deficient yeasts with enhanced sensitivity to a pheromone (sex hormone) that controls the cell cycle at a G1 phase are preferable. When yeast fungi are Bar1-deficient yeasts, the abundance ratio of yeast fungi with uncontrolled cell cycles can be reduced. This makes it possible to, for example, prevent a specific nucleic acid from increasing in number in the cells contained in a container.

The prokaryotic cells are not particularly limited and may be appropriately selected depending on the intended purpose. Examples of the prokaryotic cells include eubacteria and archaea. One of these kinds of prokaryotic cells may be used alone or two or more of these kinds of prokaryotic cells may be used in combination.

The fluorescent protein is not particularly limited and may be appropriately selected depending on the intended purpose. Examples of the fluorescent protein include a green fluorescent protein (GFP), a red fluorescent protein (RFP), and a yellow fluorescent protein (YFP). The fluorescent dye for stained cells is not particularly limited and may be appropriately selected depending on the intended purpose. Examples of the fluorescent dye include cell tracker orange and cell tracker red.

When flocculation of particles occurs, adjusting the concentration of particles in the suspension containing the particles such as light-emitting particles 70 filled in the liquid chamber 21 of the liquid droplet discharging unit 20 makes it possible to adjust the number of particles in the suspension, according to a theory that the concentration of particles in a suspension and the number of particles in the suspension conform to a Poisson distribution. The liquid component of the suspension is not particularly limited and may be appropriately selected depending on the intended purpose. Examples of the liquid component include ion-exchanged water.

The diameter of a liquid droplet is not particularly limited, may be appropriately selected depending on the intended purpose, and is preferably 25 micrometers or greater but 150 micrometers or less. When the diameter of a liquid droplet is 25 micrometers or greater, the diameter of a liquid droplet is not small, particles to be contained in the liquid droplet are less likely to be limited to only particles having a small diameter, and kinds of applicable particles are less likely to be limited. When the diameter of a liquid droplet is 150 micrometers or less, the diameter is qualifiable as a liquid droplet, there is no need for using an inkjet head having a large hole diameter in order to discharge a liquid droplet, and discharging of liquid droplets is less likely to be unstable. When it is assumed that the diameter of a liquid droplet is R and the diameter of a particle is r, it is preferable that R>3r be satisfied. When R>3r is satisfied, because the diameter of a particle is not large relative to the diameter of a liquid droplet, the particle is less likely to be affected by the edge of the liquid droplet, and the accuracy of counting the number of particles is less likely to be poor.

The light irradiating unit 30 is a unit configured to irradiate a liquid droplet 50 discharged by the liquid droplet discharging unit 20 with light. A synchronization signal is input to the light irradiating unit 30 from the control device 10. In response to the input of a synchronization signal, the light irradiating unit 30 irradiates the liquid droplet 50 with laser light 81 serving as illumination light in synchronization with the timing at which the liquid droplet 50 is discharged by the liquid droplet discharging unit 20.

It is preferable that the light irradiating unit 30 be capable of irradiating the liquid droplet 50 with light in synchronization with discharging of the liquid droplet 50 by the liquid droplet discharging unit 20. This makes it possible to irradiate the liquid droplet 50 discharged by the liquid droplet discharging unit 20 with light more infallibly. Being in synchronization means that the light irradiating unit 30 irradiates the liquid droplet 50 with laser light 81 when the liquid droplet 50 has come to a predetermined position after discharged. That is, the light irradiating unit 30 irradiates the liquid droplet 50 with light with a delay of a predetermined period of time from the discharging of the liquid droplet 50 by the liquid droplet discharging unit 20.

The light irradiating unit 30 is not particularly limited and may be appropriately selected depending on the intended purpose. Examples of the light irradiating unit 30 include a solid-state laser, a semiconductor laser, and a dye laser. Examples of the solid-state laser include a YAG laser, a Ruby laser, and a glass laser. Examples of a commercially available product of the YAG laser include EXPLORER ONE-532-200-KE (available from Spectra-Physics, Inc., with an output wavelength of 532 nm by SHG). Among these light irradiating units, a light irradiating unit capable of irradiating a target with pulsed light by pulse oscillation is preferable.

The pulse width of the pulsed light is not particularly limited, may be appropriately selected depending on the intended purpose, and is preferably 10 microseconds or less and more preferably 1 microsecond or less.

The energy per unit pulse is not particularly limited, may be appropriately selected depending on the intended purpose, and is preferably 0.1 microjoules or higher and more preferably 1 microjoule or higher, although significantly depending on the optical system such as presence or absence of light condensation. However, some fluorescent particles may undergo photobleaching. In this case, it is preferable to restrict the energy per unit pulse or unit time. Likewise, depending on the purpose for which fluorescent particles or other light-emitting particles are used, light irradiation may give adverse influences. Also in this case, it is preferable to restrict the energy per unit pulse or unit time.

The light detecting unit (light receiving unit) 40 is a unit configured to detect (receive) luminescence by a light-emitting particle contained in a liquid droplet in response to irradiation of light emitted by the light irradiating unit. The light receiving unit 40 is electrically coupled to the light irradiating unit 30 and the control device 10, and a synchronization signal is input to the light receiving unit 40 from the control device 10. In response to the input of a synchronization signal, the light receiving unit 40 receives light 82 in synchronization with a timing at which a light-emitting particle 70 undergoes luminescence in response to the laser light 81 from the light irradiating unit 30.

The light receiving unit 40 is a light sensing device/module capable of measuring presence or absence of a light-emitting particle 70 in a liquid droplet 50. The light receiving unit 40 outputs light reception information to the control device 10 to which the light receiving unit 40 is electrically coupled, in order that the control device 10 can measure presence or absence of a light-emitting particle 70 in a liquid droplet 50 based on the information from the light receiving element.

Because the light receiving unit 40 needs at least be capable of measuring presence or absence of a light-emitting particle 70 in cooperation with the control device 10, a light sensing device/unit with a low receivable amount of information can be used as the light receiving unit 40. For example, a photo multitube (PMT, a photomultiplier tube), an avalanche photo-diode (APD), a pin-photo diode (pin-PD), and a low-resolution CMOS image capturing device can be used. These devices are capable of high-speed, high-frequency sampling and have a high light utilization efficiency as well, and can output an appropriate amount of information for which a needed signal-to-noise ratio (SNR) is ensured to the control device when these devices receive weak fluorescence from a light-emitting particle 70 contained in a liquid droplet 50.

When an APD is used as the light receiving unit 40, the APD can output a quantity of luminescence, which is one-dimensional information from a fluorescent particle 70, to the control device 10. The APD may be selected from APD modules such as APD 410 (with a bandwidth of 100 MHz, a diameter of 1 mm, and a sensitivity of 1×105 V/W, available from Matsusada Precision Inc.), APD 130A (with a bandwidth of 50 MHz, a diameter of 1 mm, and a sensitivity of 2.5>106 V/W, available from Thorlabs Japan Inc.), C10508-01 (with a bandwidth of 100 MHz, a diameter of 1 mm, and a sensitivity of 1.3>107 V/W, available from Hamamatsu Photonics K.K.), and APD 410A (with a bandwidth of 10 MHz, a diameter of 1 mm, and a sensitivity of 2.7×107 V/W, available from Thorlabs Japan Inc.) in consideration of appropriate bandwidth and sensitivity depending on, for example, the intended purpose and the kind of the illumination light used.

It is preferable that the light receiving unit 40 be capable of receiving light 82 from a light-emitting particle 70 in synchronization with discharging of a liquid droplet 50 by the liquid droplet discharging unit 20. In this case, a liquid droplet 50 discharged by the liquid droplet discharging unit 20 is irradiated with laser light 81 from the light irradiating unit 30, making it possible for light 82 from a fluorescent particle 70 to be received more infallibly. Here, for example, being in synchronization means that the light receiving unit 40 receives light 82 at a timing at which a particle 70 undergoes luminescence when a liquid droplet 50 having come to a predetermined position after discharged is irradiated with laser light 81. That is, the light receiving unit 40 detects light 82 with delays of predetermined periods of time from the discharging of the liquid droplet 50 by the liquid droplet discharging unit 20 and the irradiation with laser light 81 by the light irradiating unit 30, respectively. Such adjustment of delays can be realized in cooperation with a separate function generator, in a manner that the function generator outputs synchronization signals in consideration of the respective delays. Moreover, the function of the function generator may be integrated with the liquid droplet discharging unit 20.

When light from a light-emitting particle 70 is weaker than the laser light 81 emitted by the light irradiating unit 30, it is preferable to install a filter configured to attenuate the wavelength range of the laser light 81 at the light receiving surface side of the light receiving unit 40. With the filter installed, the light receiving unit 40 can receive luminescent light with noise suppressed. Examples of the filter include a notch filter with an optical density of 6 or higher and configured to attenuate a specific wavelength range including the wavelength of the light.

The control device 10 may include, for example a digitizer, a data logger, or an oscilloscope as part of the control device 10. The digitizer is a module (product) mounted with an ADC (analog/digital converter). Examples of the digitizer include APX-510 (16 bits/100 MHz sampling, available from Aval Data Corporation), and DIG-100M1002-PCI (10 bits/100 MHz sampling, available from Contec Ltd.), which are provided as an expanded board of a personal computer (PC). The control device 10 may be constituted by a plurality of PCs. In this case, processes to be performed by the control device 10 may be performed in the form of distributed processing. When the control device 10 includes a plurality of PCs, the PCs may be coupled to each other via a network. Further, the processes to be performed by the control device 10 may be performed by a cloud-type computer.

By being digitized by, for example, a digitizer, analog information output from the light receiving unit 40 may be output to an information processing unit, which is a part of the control device 10 coupled to the digitizer. Although the digitized information acquired from a light-emitting particle 70 is small-size one-dimensional acquired information, the information processing unit can determine presence or absence of a fluorescent particle based on, for example, a criterion by a threshold quantity prescribed for a quantity of luminescence or a criterion by a temporal domain profile of a quantity of luminescence, and measure presence or absence of a fluorescent particle. As the information processing unit, which is a part of the control device 10, for example, a personal computer (PC) and image processing software installed in the PC may be used.

Measurement of presence or absence of a light-emitting particle 70 is a qualitative measurement in which it is only needed to confirm luminescence by a light-emitting particle 70. Therefore, even when the amount of information acquired is small, a highly precise measurement compared with measurement of the number of light-emitting particles 70, i.e., a measurement with a high true value rate can be realized. Furthermore, as an effect obtained from that it is allowed that the amount of information acquired be low, the operation of the light receiving unit 40 for acquiring information about light 82, output of the acquired information, and information processing of the acquired information by the control device 10 become simple. Therefore, a simultaneous, high-speed measurement can be realized.

The configuration of the discharging device 100 according to the present embodiment have been described above. Next, the functional configuration of the control device 10 will be described with reference to the function block diagram illustrated in FIG. 2.

Figure 2:
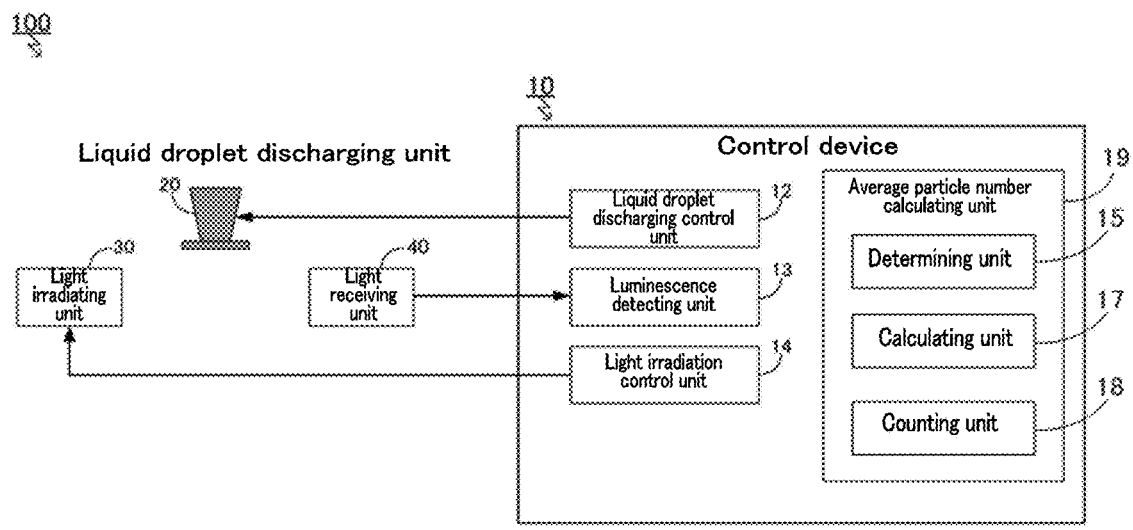
FIG. 2 is a function block diagram illustrating an example of a control device of a discharging device of the present disclosure.

As illustrated in FIG. 2, the control device 10 according to the present embodiment includes a liquid droplet discharging control unit 12, a luminescence detecting unit 13, a light irradiation control unit 14, and an average particle number calculating unit 19, and further includes other units as needed.

The average particle number calculating unit 19 preferably includes a determining unit 15 configured to perform a determining operation, a calculating unit 17 configured to perform a calculating operation, and a counting unit 18 configured to perform a counting operation, and further includes other units as needed. In the present embodiment, the average particle number calculating unit 19 includes a determining unit 15, a calculating unit 17, and a counting unit 18. By cooperation among the units described above, the discharging device 100 can perform a dispensing operation of dispensing light-emitting particles 70 by a predetermined number into a container 60.

The liquid droplet discharging control unit 12 is a unit configured to control the liquid droplet discharging unit 20 to discharge a liquid droplet having a predetermined liquid amount.

The light irradiation control unit 14 controls the light irradiating unit 30 to irradiate a liquid droplet discharged by the liquid droplet discharging unit 20 with light. It is preferable that the light irradiation control unit 14 be configured to synchronize the irradiation timing of the light irradiating unit 30 with the discharging timing of the liquid droplet discharging unit 20 in order that a liquid droplet discharged may be irradiated with light before the liquid droplet lands in the container 60.

The luminescence detecting unit 13 is a unit configured to detect luminescence by a light-emitting particle contained in a liquid droplet discharged by the liquid droplet discharging unit 20 based on a detected intensity of light received by the light receiving unit 40.

The determining unit 15 of the average particle number calculating unit 19 is configured to perform a determining operation, which is an operation of determining presence or absence of a light-emitting particle 70 in a liquid droplet 50 depending on whether the light receiving unit 40, which is an example of a light detecting unit, has detected luminescence 82 by a light-emitting particle 70.

The calculating unit 17 of the average particle number calculating unit 19 is configured to perform a calculating operation of calculating the average particle number, which is an average, among all liquid droplets discharged, in number of light-emitting particles 70 contained per liquid droplet 50, based on a ratio of liquid droplets 50 containing no light-emitting particle 70 relative to all the liquid droplets discharged, the ratio being calculated based on the presence or absence of a light-emitting particle 70 (based on the determination result of the determining unit 15).

More specifically, the calculating unit 17 is configured to calculate a value obtained by dividing a number of times it is determined that no light-emitting particle is contained in a liquid droplet by the total number of times liquid droplets have been discharged (total number of liquid droplets) based on the determination result of the determining unit 15, as a ratio (probability) at which no light-emitting particle is contained in a liquid droplet discharged by the liquid droplet discharging unit 20.

Then, the calculating unit 17 is configured to calculate the average number (hereinafter, referred to as average particle number) of light-emitting particles contained in a liquid droplet discharged by the liquid droplet discharging unit 20 based on the probability calculated.

In the present embodiment, the average particle number calculated by the calculating unit 17 is an estimated value calculated based on the probability at which no light-emitting particle is contained in a liquid droplet discharged by the liquid droplet discharging unit 20. Hence, in the following description, there may be a case where an expression that the calculating unit 17 estimates the average particle number is used.

The counting unit 18 of the average particle number calculating unit 19 is configured to count the number of light-emitting particles in all liquid droplets discharged by the liquid droplet discharging unit 20, by multiplying the average particle number estimated by the calculating unit 17 by the total number of liquid droplets discharged by the liquid droplet discharging unit 20. In this way, the discharging device 100 can dispense particles by a prescribed number into the container 60.

The functional configuration of the control device 10 have been described above. Next, the contents of the operations performed by the determining unit 15 and the calculating unit 17 constituting the control device 10 will be described.

First, the method according to which the determining unit 15 determines presence or absence of a light-emitting particle in a liquid droplet will be described.

Figure 3A:
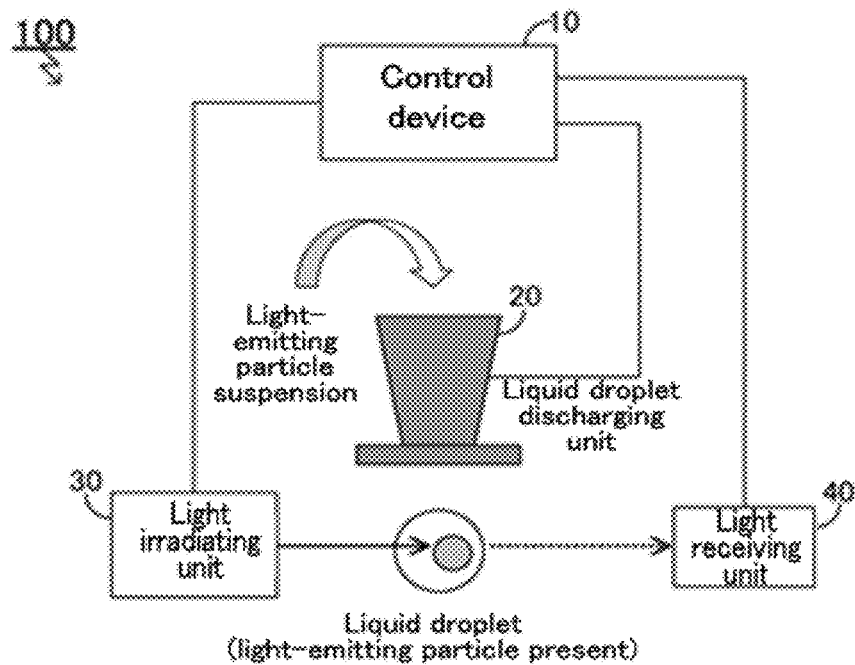
FIG. 3A is a concept diagram illustrating an example of a method for determining presence or absence of light-emitting particles.
Figure 3B:
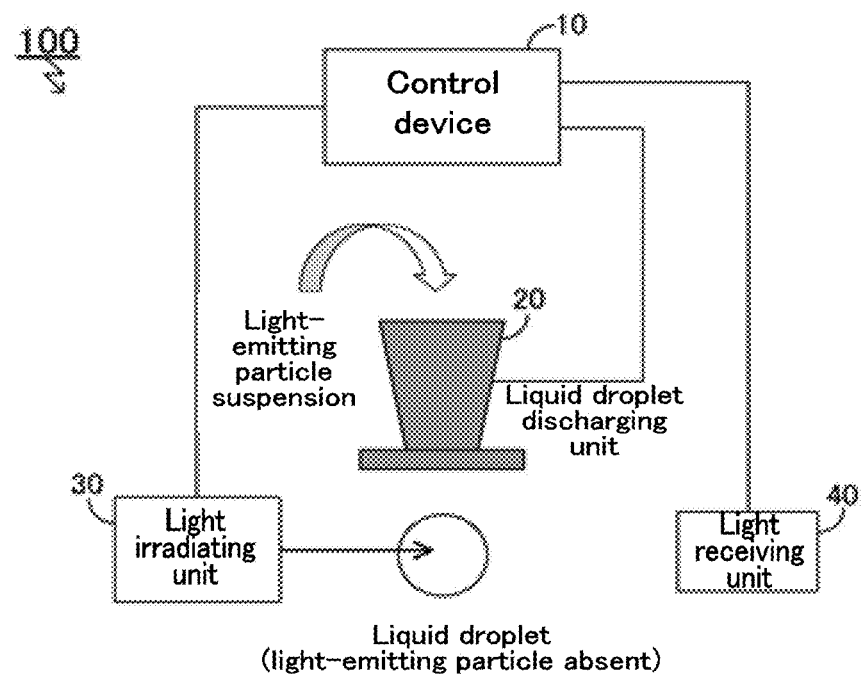
FIG. 3B is a concept diagram illustrating another example of a method for determining presence or absence of light-emitting particles.

As illustrated in FIG. 3A, when one or more light-emitting particles are contained in a liquid droplet discharged by the liquid droplet discharging unit 20, the one or more light-emitting particles undergo luminescence in response to irradiation of light emitted by the light irradiating unit 30, and the luminescent light is received by the light receiving unit 40. On the other hand, as illustrated in FIG. 3B, when no light-emitting particle is contained in a liquid droplet discharged by the liquid droplet discharging unit 20, no light is received by the light receiving unit 40.

Figure 4:
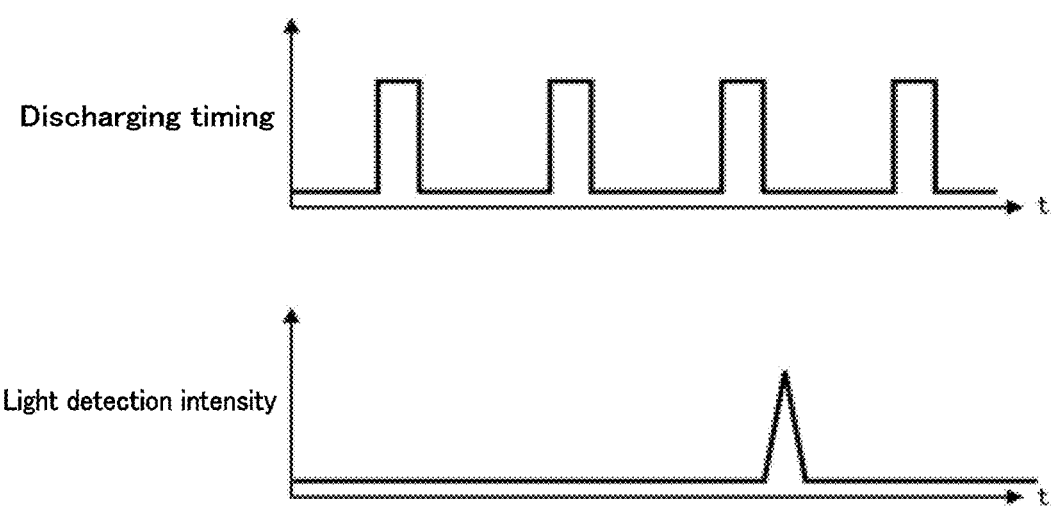
FIG. 4 is a concept diagram illustrating another example of a method for determining presence or absence of light-emitting particles.

On this premise, as illustrated in FIG. 4, the determining unit 15 compares a signal indicating the discharging timing of the liquid droplet discharging unit 20 with a light detection intensity signal of the light received by the light receiving unit 40. When a light detection intensity higher than or equal to a predetermined threshold is detected in synchronization with the discharging timing at which a liquid droplet is discharged, the determining unit 15 determines that a light-emitting particle is contained in the liquid droplet. When no light detection intensity higher than or equal to the predetermined threshold is detected, the determining unit 15 determines that no light-emitting particle is contained in the liquid droplet. The state of a light detection intensity being detected in synchronization with the discharging timing at which at a liquid droplet is discharged refers to a state of a light detection intensity being detected without a delay longer than or equal to a predetermined threshold period of time from the discharging timing.

Next, the method according to which the calculating unit 17 estimates the average particle number will be described.

When it is assumed that the particle distribution in the light-emitting particle suspension conforms to a Poisson distribution, it can be assumed that the particle distribution in a liquid droplet discharged by the liquid droplet discharging unit 20 also conforms to a Poisson distribution. According to this assumption, when the average particle number of light-emitting particles contained in one liquid droplet discharged is $\lambda$, a probability $P(\lambda, x)$ at which x number of light-emitting particles are contained in one liquid droplet discharged can be expressed by a formula (1) below. In the formula (1) below, e represents Napier's constant, and x! represents the factorial of x.

$$P(\lambda, x) = \lambda x / x! \times e^{-\lambda} \quad (1)$$

Figure 5:
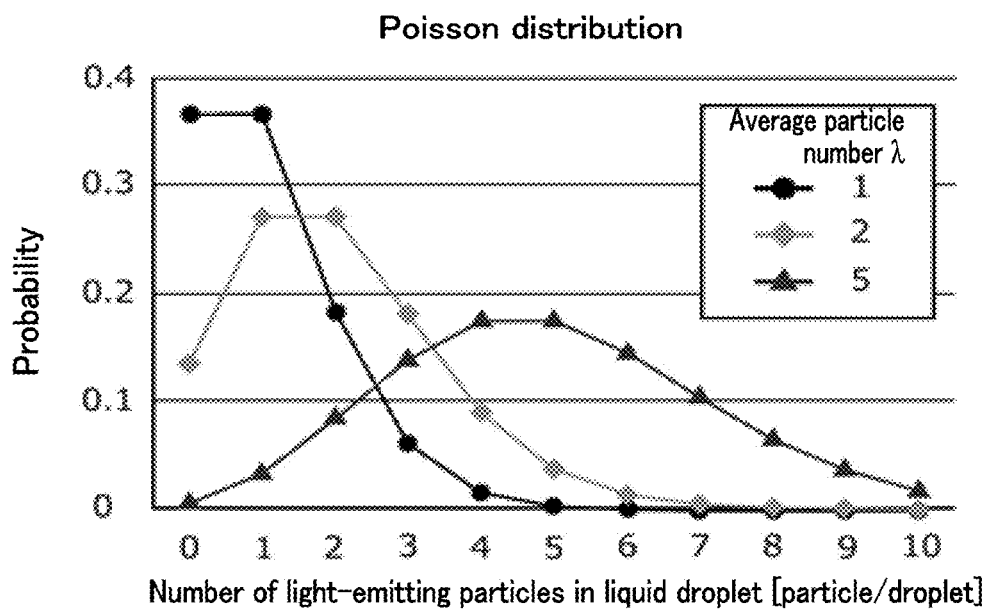
FIG. 5 is a graph plotting Poisson distributions when an average particle number λ is 1, 2, and 5.

As expressed by the formula (1), the probability $P(\lambda, x)$ is a function of the average particle number $\lambda$ and the particle number x of light-emitting particles contained in a liquid droplet. Therefore, when the average particle number $\lambda$ is determined, a Poisson distribution is determined uniquely. FIG. 5 plots Poisson distributions when the average particle number $\lambda$ is 1, 2, and 5.

$$\lambda - \ln(P(x=0)) \quad (2)$$

A probability P (x=0) at which no light-emitting particle is contained in a liquid droplet discharged monotonically decreases relative to $\lambda$. Therefore, when the probability P(x=0) is determined, the average particle number $\lambda$ is determined uniquely. On this premise, the calculating unit 17 calculates the probability P(x=0), and using the calculated probability P(x=0), estimates the average particle number $\lambda$ according to the formula (2) above. When P(x=0) is high, i.e., when the probability at which no light-emitting particle is contained in a liquid droplet discharged is high, $\lambda$ is low. Conversely, when P(x=0) is low, i.e., when the probability at which no light-emitting particle is contained in a liquid droplet discharged is low, $\lambda$ is high.

Figure 6:
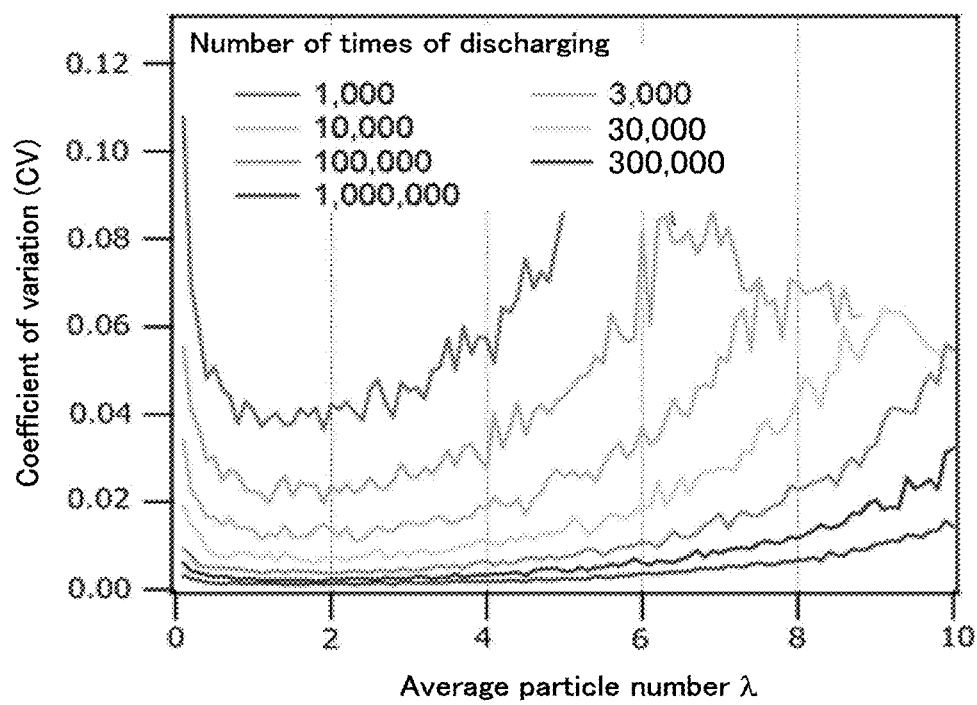
FIG. 6 is a graph plotting an example of a result of simulation of an average particle number λ.

FIG. 6 plots a result of simulation of the average particle number λ estimated by the method described above. In this simulation, the probability P(x=0) was calculated based on the results of the determining operation obtained from the cases where, with the average number of light-emitting particles to be contained in a liquid droplet intended to be constant, a liquid droplet was discharged by the discharging device 100 predetermined number of times (1,000 times, 3,000 times, 10,000 times, 30,000 times, 100,000 times, 300,000 times, and 1,000,000 times) with generation of a random number from a Poisson distribution as the number of light-emitting particles to be contained in the liquid droplet discharged, and the average particle number λ was estimated based on the calculated probability P(x=0). In this simulation, the trial run described above was repeated a hundred times, and a coefficient of variation (CV) was calculated based on the average value and standard deviation of the average particle numbers λ achieved in the hundred trial runs.

FIG. 6 is a diagram plotting the results of the hundred trial runs, with the average particle number λ represented on the horizontal axis and the coefficient of variation (CV) represented on the vertical axis. As plotted in FIG. 6, it can be seen that variations (CV) are the lowest when the average particle number λ is from 1 through 2, and variations (CV) are within a tolerable range even when the average particle number λ is 5 (CV=0.8% when the number of discharging times is 100,000 times, and CV=8.7% when the number of discharging times is 1,000 times). That is, the average particle number is preferably 1 or greater but 2 or less. With the average particle number intended to be 1 or greater but 2 or less, the discharging device 100 can dispense light-emitting particles by a predetermined number more accurately by suppressing variation in the number of light-emitting particles to be contained in a liquid droplet.

As the tolerable range mentioned above (a range in which variation in the number of particles is tolerated), CV is preferably 15% or lower. When the range of variation in the number of particles is in the preferable range described above, the Bioanalytical Method Validation Guidance for Industry standard of United States' Food and Drug Administration (FDA) can be satisfied.

The contents of the operations performed by the determining unit 15 and the calculating unit 17 have been described above. Next, a dispensing operation performed by the discharging device 100 according to the present embodiment will be described. In the following description, three kinds of execution modes of the discharging device 100 will be described in order.

(First Execution Mode)

Figure 7:
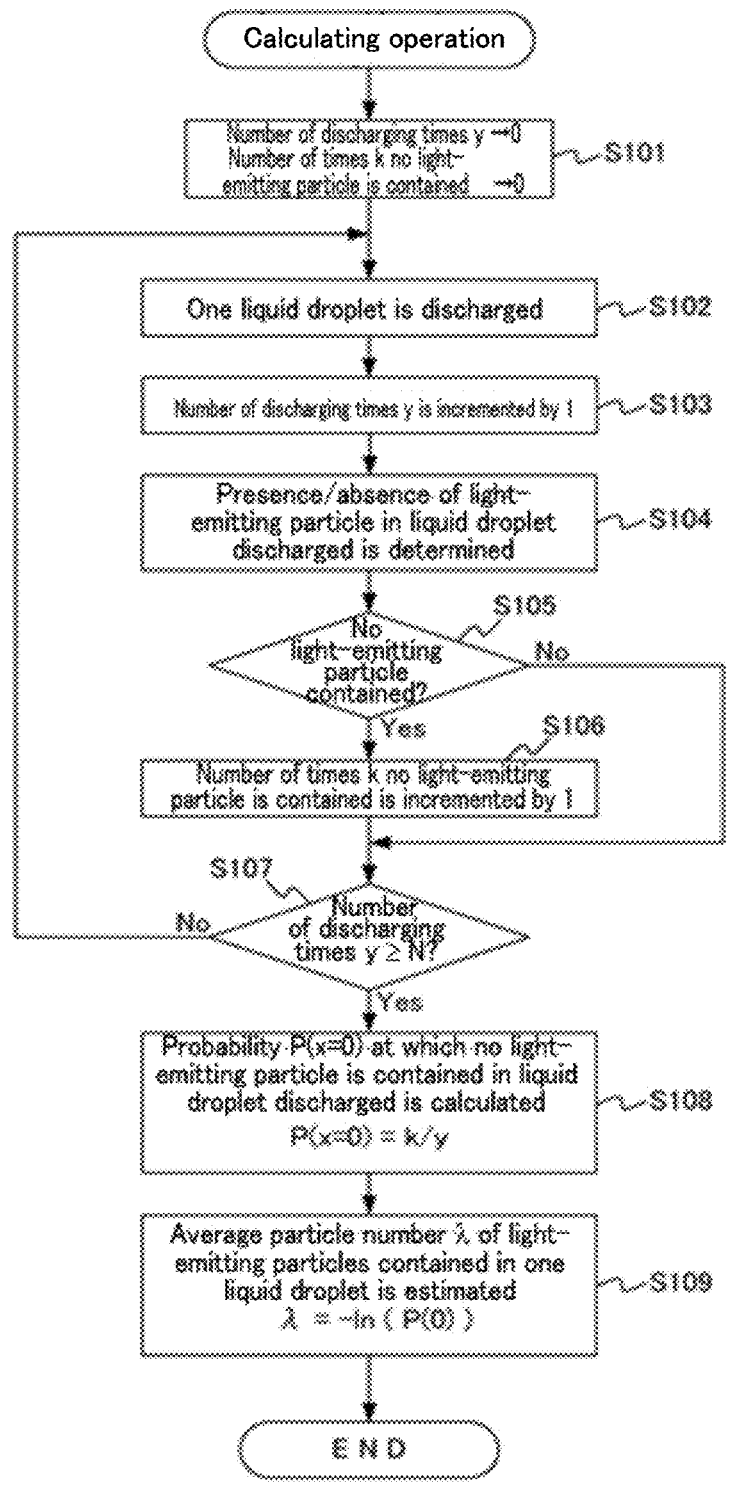
FIG. 7 is a flowchart illustrating an example of an average particle number calculating operation.

In the discharging device 100 in the first execution mode, after the liquid droplet discharging control unit 12, the luminescence detecting unit 13, the light irradiation control unit 14, the determining unit 15, and the calculating unit 17 work in cooperation to previously estimate the average particle number λ, the counting unit 18 counts the number of light-emitting particles discharged, using the estimated average particle number λ, and the light-emitting particles are dispensed. Here, a calculating operation for calculating (estimating) the average particle number λ will be described with reference to the flowchart illustrated in FIG. 7.

In the step 101, a number of discharging times y liquid droplets have been discharged (=number y of liquid droplets discharged) and a number of determination times k it is determined that no light-emitting particle is contained in a liquid droplet are set to initial values (0).

In the next step 102, the liquid droplet discharging unit 20 discharges one liquid droplet formed of the light-emitting particle suspension and having a predetermined liquid amount. In the next step S103, the number of discharging times y is incremented by 1. Judging from the result of simulation described with reference to FIG. 6 that the CV values are low when the average particle number is about 1 or greater but 2 or less, it is advantageous to control the liquid amount of a liquid droplet. However, it is difficult to control a liquid droplet to have a high liquid amount. Therefore, in order to set the average particle number to 1 or greater but 2 or less, it is preferable to control the particle concentration of the light-emitting particle suspension (the same applies in the other execution modes described below).

In the next step 104, presence or absence of a light-emitting particle in the liquid droplet discharged is determined by the method described above. When it is not determined that no light-emitting particle is contained in the liquid droplet (step S105, No), the flow moves to the step 107 to determine whether the number of discharging times y has reached a set number of times N that is set beforehand. When the number of discharging times y has not reached the set number of times N (step S107, No), the flow returns to the step S102.

On the other hand, when it is determined that no light-emitting particle is contained in the liquid droplet (step 105, Yes), the flow moves to the step 106 to increment the number of determination times k by 1. Subsequently, in the next step 107, whether the number of discharging times y has reached the set number of times N is determined. When the number of discharging times y has not reached the set number of times N (step S107, No), the flow returns to the step S102.

Afterwards, the series of processes described above (steps 102 to 107) are repeated until the number of discharging times y has reached the set number of times N. When the number of discharging times y has reached the set number of times N (step 107, Yes), the flow moves to the step 108.

In the next step 108, a value obtained by dividing the number of determination times k having been reached until then by the number of discharging times y having been reached until then is calculated, as a probability P(x=0) at which no light-emitting particle is contained in a liquid droplet.

In the next step 109, the average particle number λ is estimated by the method described above, using the probability P(x=0) calculated in the previous step 108.

Figure 8:
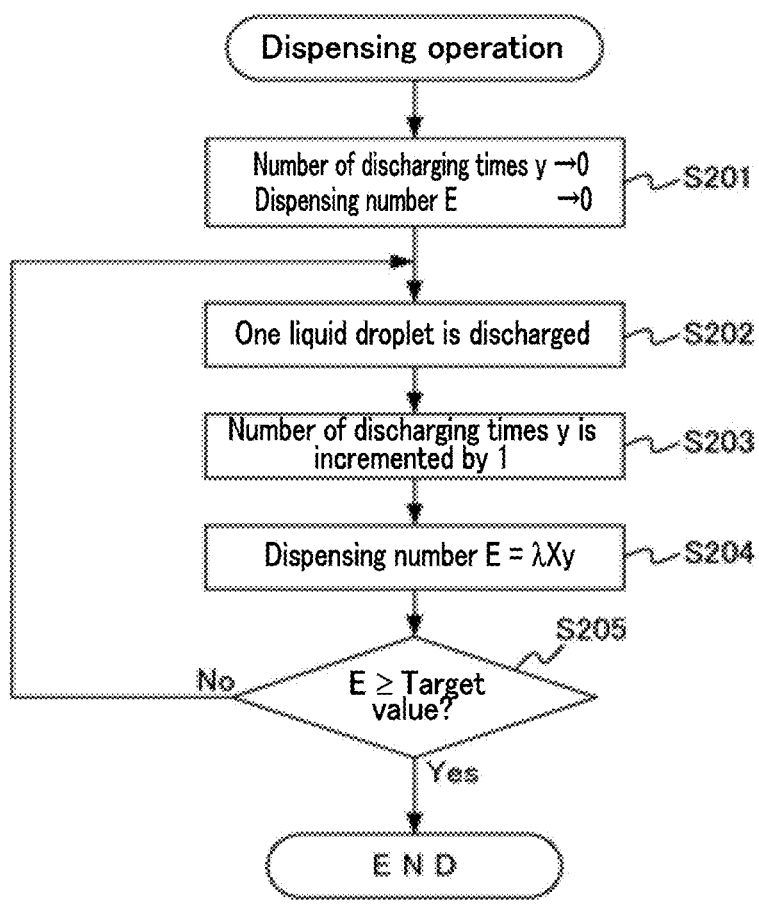
FIG. 8 is a flowchart illustrating an example of a dispensing operation.

Next, a dispensing operation performed by the discharging device 100 will be described with reference to the flowchart illustrated in FIG. 8.

First, in the step 201, a number of discharging times y liquid droplets have been discharged and an expected value E of the number of light-emitting particles dispensed (hereinafter, referred to as dispensing number) are set to initial values (0).

In the next step 202, the liquid droplet discharging unit 20 discharges one liquid droplet formed of the light-emitting particle suspension and having a predetermined liquid amount. In the next step 203, the number of discharging times y is incremented by 1.

In the next step 204, a value obtained by multiplying the average particle number λ estimated in the previous calculating operation by the number of discharging times y having been reached until then is calculated as the expected value E of the dispensing number.

$$E = \lambda \times y \quad (3)$$

In the next step 205, whether the expected value E has reached a target value that is set beforehand is determined. Afterwards, the series of processes described above (steps 202 to 204) are performed repeatedly until before the expected value E has reached the target value (step 205, No). Subsequently, when the expected value E has reached the target value (step S205, Yes), the flow ends.

The first execution mode has been described above. Existing discharging devices commonly perform sorting under a condition that makes the average number of particles contained in a liquid droplet less than 1, using a particle suspension having a low concentration. As compared, according to the present embodiment, it is possible to count the number of particles accurately even when a particle suspension having a concentration high enough to have particles contained in a liquid droplet in an average number of from 1 through 5 is used, as indicated by the result of simulation in FIG. 6. Therefore, it is possible to reduce a dispensing time (the same applies in any other execution mode described below).

(Second Execution Mode)

Figure 9:
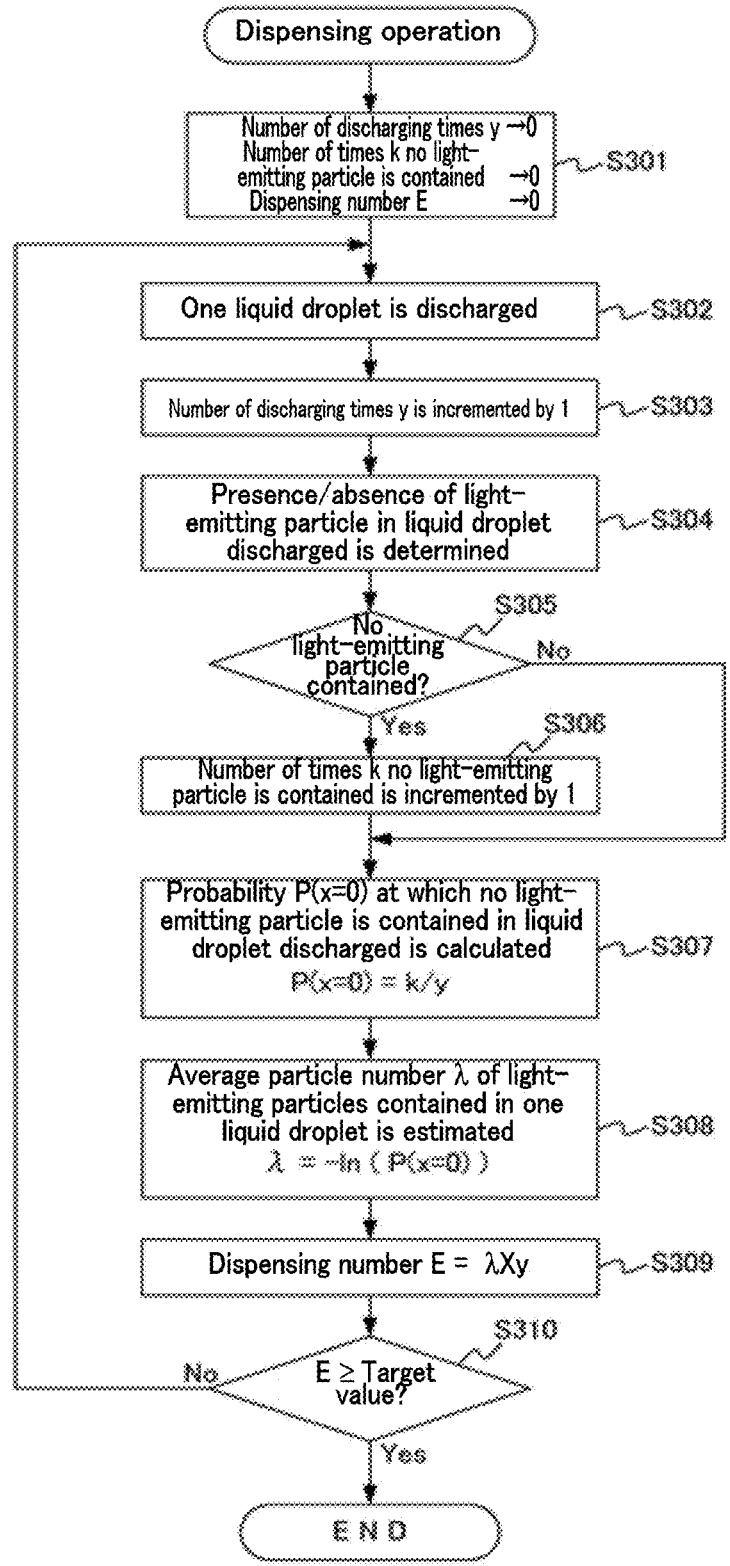
FIG. 9 is a flowchart illustrating another example of a dispensing operation.

In the first execution mode, the dispensing operation is performed using the average particle number $\lambda$ estimated previously. As compared, in the discharging device 100 in the second execution mode, by cooperation among the liquid droplet discharging control unit 12, the luminescence detecting unit 13, the light irradiation control unit 14, the determining unit 15, the calculating unit 17, and the counting unit 18 work in cooperation to perform estimation of the average particle number $\lambda$ and the dispensing operation simultaneously. The dispensing operation in the second execution mode will be described below with reference to the flowchart illustrated in FIG. 9.

First, in the step 301, the number of discharging times y liquid droplets have been discharged, the number of determination times k it is determined that no light-emitting particle is contained in a liquid droplet, and the expected value E of the dispensing number are set to initial values (0).

In the next step 302, the liquid droplet discharging unit 20 discharges one liquid droplet formed of the light-emitting particle suspension and having a predetermined liquid amount. In the next step 303, the number of discharging times y is incremented by 1.

In the next step 304, presence or absence of a light-emitting particle in the liquid droplet discharged is determined by the method described above. When it is not determined that no light-emitting particle is contained in the liquid droplet (step 305, No), the flow moves to the step 307. On the other hand, when it is determined that no light-emitting particle is contained in the liquid droplet (step 305, Yes), the flow moves to the step 306 to increment the number of determination times k by 1, and then moves to the step 307.

In the next step 307, a value obtained by dividing the number of determination times k having been reached until then by the number of discharging times y having been reached until then is calculated, as a probability P(x=0) at which no light-emitting particle is contained in a liquid droplet.

In the next step 308, the average particle number $\lambda$ is estimated by the method described above, using the probability P(x=0) calculated in the previous step 307.

In the next step 309, a value obtained by multiplying the latest average particle number $\lambda$ estimated in the previous step 308 by the number of discharging times y having been reached until then is calculated, as the expected value E of the dispensing number.

In the next step 310, whether the expected value E has reached a target value that is set beforehand is determined. Afterwards, the series of processes described above (steps 302 to 310) are performed repeatedly until before the expected value E has reached the target value (step 310, No). In the meantime, each time a new liquid droplet is discharged, the probability P(x=0) is calculated again, the average particle number $\lambda$ is estimated again based on the probability P(x=0) calculated again, and a value obtained by multiplying the latest average particle number $\lambda$ estimated again by the number of discharging times y having been reached until then is calculated as the dispensing number. Then, when the expected value E has reached the target value (step 310, Yes), the flow ends.

That is, in the second execution mode, the average particle number calculating unit calculates a ratio of liquid droplets containing no light-emitting particle relative to all liquid droplets each time a new liquid droplet is discharged, calculates again the average particle number based on the ratio calculated, and counts the number of light-emitting particles in all liquid droplets discharged by the liquid droplet discharging unit by multiplying the average particle number calculated again by the number of all liquid droplets discharged by the liquid droplet discharging unit.

The second execution mode has been described above. In the second execution mode, the previous operation for estimating the average particle number $\lambda$ is not performed. Therefore, there is an advantage that the dispensing can be started immediately without wasting the sample.

(Third Execution Mode)

Figure 10:
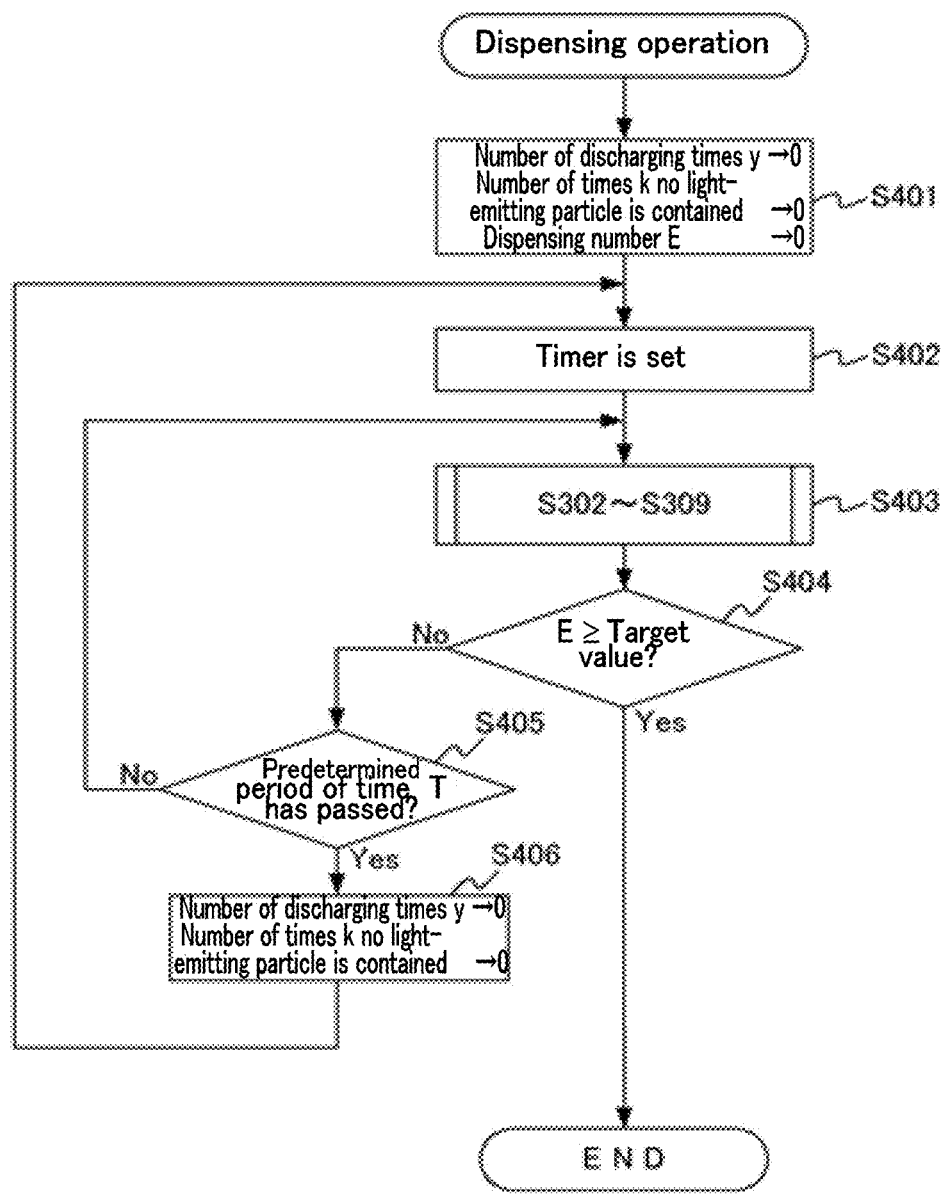
FIG. 10 is a flowchart illustrating another example of a dispensing operation.

In the second execution mode, the probability P(x=0) is calculated based on all of the determination results made by the determining unit 15. As compared, in the third execution mode, each time a predetermined period of time has passed, the probability P(x=0) is calculated based on determination results to be made afterwards. The dispensing operation in the third execution mode will be described below with reference to the flowchart illustrated in FIG. 10.

In the step 401, the number of discharging times y liquid droplets have been discharged, the number of determination times k it is determined that no light-emitting particle is contained in a liquid droplet, and the expected value E of the dispensing number are set to initial values (0).

In the next step 402, a timer for counting a predetermined period of time T is set.

In the next step 403, the same processes as in the step 302 to the step 309 in the second execution mode (see FIG. 9) are performed.

In the next step 404, whether the expected value E has reached a target value that is set beforehand is determined.

As a result, when the expected value E has not reached the target value (step 404, No), whether the predetermined period of time T has passed is determined in the next step 405. When the predetermined period of time T has not passed (step 405, No), the flow returns to the step 403. On the other hand, when the predetermined period of time T has passed (step 405, Yes), the number of discharging times y and the number of determination times k are reset to the initial values (0) in the next step 406, and then the flow returns to the step 401.

Afterwards, the series of processes described above (steps 402 to 406) are performed repeatedly until the expected value E has reached the target value. When the expected value E has reached the target value (step 404, Yes), the flow ends.

That is, in the third execution mode, each time a predetermined period of time has passed, the average particle number calculating unit 19 calculates a ratio of liquid droplets containing no light-emitting particle relative to all liquid droplets, based on information to be obtained afterwards about presence or absence of a light-emitting particle.

The third execution mode has been described above. In the third execution mode, each time the predetermined period of time T set beforehand has passed, the determination results about presence or absence of a particle made so far are annulled, and the probability P(x=0) is calculated again based on determination results to be made afterwards. Therefore, there is an advantage that influence of any sedimentation of particles in the liquid droplet discharging unit 20 on the counting accuracy and influence of any external disturbance on the counting accuracy are minimized.

The dispensing operation performed by the discharging device 100 according to the present embodiment and a discharging method using the discharging device 100 have been described above. Next, a method for counting the number of particles that do not undergo luminescence per se using the method described above will be described.

(Method for Counting Number of Non-Light-Emitting Particles)

First, a suspension 1 containing arbitrary light-emitting particles (for example, fluorescent polymer particles) at a predetermined concentration and a suspension 2 containing, at a predetermined concentration, non-light-emitting particles, which are arbitrary particles serving as the target of counting and do not undergo luminescence even in response to receiving light that causes the light-emitting particles to undergo luminescence, are prepared.

Next, the prepared suspension 1 having the known concentration and the prepared suspension 2 having the known concentration are mixed at a predetermined mixing ratio (ratio by volume), to prepare a mixture suspension.

Next, the prepared mixture suspension is set in the discharging device 100, and liquid droplets formed of the mixture suspension and having a predetermined liquid amount are continuously discharged into a container, while counting the number of light-emitting particles discharged into the container by the same method as described above.

Finally, the number of non-light-emitting particles discharged into the container is calculated based on the counted number of light-emitting particles and the mixing ratio (ratio by volume) of the mixture suspension. Specifically, a value obtained by multiplying the counted number of light-emitting particles by the mixing ratio (i.e., non-light-emitting particle suspension 2/light-emitting particle suspension 1) of the mixture suspension is counted as the number of non-light-emitting particles.

That is, in the present disclosure, in the case of counting the number of non-light-emitting particles, it is preferable to mix a suspension suspending light-emitting particles at a known concentration and a suspension suspending at a known concentration, non-light-emitting particles that do not undergo luminescence even in response to irradiation of light with each other at a predetermined mixing ratio to prepare a mixture suspension, and in discharging the liquid droplets of the mixture suspension, to count the number of light-emitting particles in all liquid droplets discharged and count the number of non-light-emitting particles in all the liquid droplets discharged, based on the counted number of light-emitting particles and the mixing ratio.

Use of the method described above makes it possible to count the number of particles that do not undergo luminescence per se, using the discharging device 100 according to the present embodiment. In the method described above, in terms of the counting accuracy, it is preferable to prepare the mixture suspension in a manner that the average number of light-emitting particles to be contained in a liquid droplet discharged from the mixture suspension is 1 or greater but 2 or less, on the basis of the result of simulation described with reference to FIG. 6.

As described above, according to the present embodiment, it is possible to perform dispensing accurately in a short time with a simple configuration. The present disclosure should not be construed as being limited to the embodiment described above, and various design modifications that could be deduced by those skilled in the art are included within the scope of the present disclosure.

Figure 11:
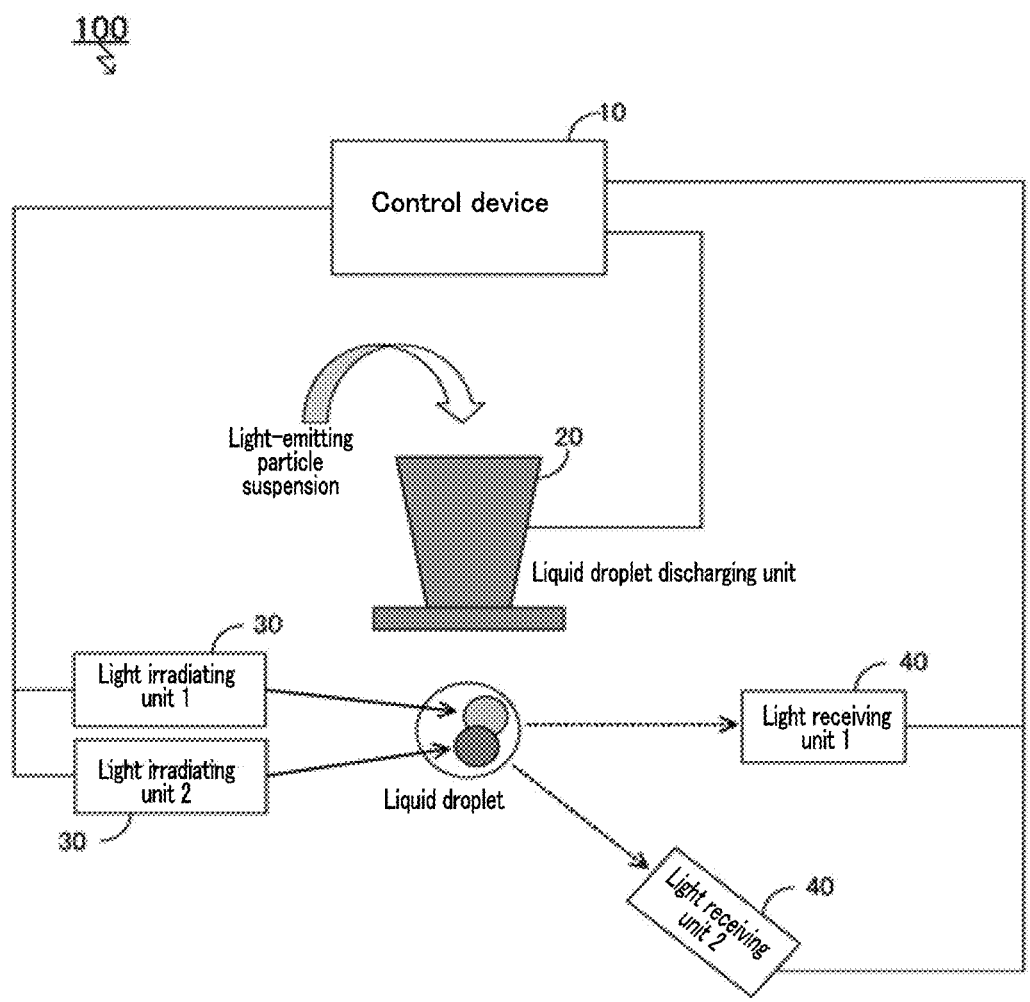
FIG. 11 is a diagram illustrating an example of a design change of a discharging device of the present disclosure.

For example, as illustrated in FIG. 11, the discharging device 100 may include a light irradiating unit configured to emit n number of kinds of rays of light having different wavelengths simultaneously (where n is an integer of 2 or greater; the same applies below) and n number of light receiving units corresponding to the n number of kinds of rays of light, such that the discharging device 100 can count the numbers of n number of kinds of light-emitting particles having different excitation wavelengths. In this case, for example, it becomes possible to count the numbers of n number of kinds of cells that emit different kinds of fluorescent rays of light kind by kind to investigate the ratio between the cells, or to find a rate at which a reporter gene (for example, a GFP reporter) is expressed.

The various functions in the embodiment described above can be realized by a program described in, for example, C, C++, C#, and JAVA (registered trademark). The program according to the present embodiment can be distributed being stored in a recording medium such as a hard disk device, CD-ROM, MO, DVD, a flexible disk, EEPROM, and EPROM, or can be transmitted through a network in a format readable by any other device.

What is claimed is:

1. A discharging device comprising:
    a liquid droplet discharging unit configured to discharge a liquid droplet containing a light-emitting particle that undergoes luminescence in response to irradiation of light;
    a light irradiating unit configured to irradiate the liquid droplet discharged by the liquid droplet discharging unit with the light;
    a light detecting unit configured to detect the luminescence by the light-emitting particle contained in the liquid droplet in response to irradiation of the light emitted by the light irradiating unit; and
    an average particle number calculating unit configured to determine presence or absence of the light-emitting particle in the liquid droplet based on whether the light detecting unit has detected the luminescence by the light-emitting particle, and calculate an average particle number, which is an average, among all liquid droplets discharged, in number of light-emitting particles contained per the liquid droplet, based on a ratio of liquid droplets containing no light-emitting particle relative to all the liquid droplets discharged, the ratio being calculated based on the presence or absence of the light-emitting particle.

2. The discharging device according to claim 1,
    wherein the average particle number calculating unit is configured to multiply the average particle number by a number of all the liquid droplets discharged by the liquid droplet discharging unit, to count a number of light-emitting particles in all the liquid droplets discharged by the liquid droplet discharging unit.

3. The discharging device according to claim 2, comprising:
the light irradiating unit configured to emit n number of kinds of rays of the light having different wavelengths simultaneously (where n is an integer of 2 or greater, same applies below); and
n number of light detecting units corresponding to the n number of kinds of rays of the light, each of the n number of light detecting units being the light detecting unit,
wherein the average particle number calculating unit is configured to count numbers of n number of kinds of light-emitting particles having different excitation wavelengths.

4. The discharging device according to claim 1,
wherein the average particle number is 1 or greater but 2 or less.

5. The discharging device according to claim 1,
wherein the average particle number calculating unit is configured to calculate the average particle number according to a formula below, $$\lambda = -\ln(P(x=0))$$

where in the formula above, $\lambda$ represents the average particle number and $P(x=0)$ represents the ratio.

6. The discharging device according to claim 1,
wherein the liquid droplet discharging unit comprises an inkjet head or a cell sorter.

7. The discharging device according to claim 1,
wherein the light-emitting particle comprises a fluorescent-stained cell or a cell retaining a fluorescent protein.

8. The discharging device according to claim 1,
wherein the average particle number calculating unit is configured to calculate the ratio each time a new liquid droplet is discharged, again calculate the average particle number based on the ratio calculated, and multiply the average particle number calculated again by a number of all the liquid droplets discharged by the liquid droplet discharging unit, to count a number of light-emitting particles in all the liquid droplets discharged by the liquid droplet discharging unit.

9. The discharging device according to claim 8,
wherein each time a predetermined period of time has passed, the average particle number calculating unit is configured to calculate the ratio based on information to be obtained afterwards about the presence or absence of the light-emitting particle.

10. A discharging method comprising:
discharging a liquid droplet containing a light-emitting particle that undergoes luminescence in response to irradiation of light;
irradiating the liquid droplet discharged in the discharging with the light;
detecting the luminescence by the light-emitting particle contained in the liquid droplet in response to irradiation of the light in the irradiating; and
determining presence or absence of the light-emitting particle in the liquid droplet based on whether the luminescence by the light-emitting particle has been detected in the detecting, and calculating an average particle number, which is an average, among all liquid droplets discharged, in number of light-emitting particles contained per the liquid droplet, based on a ratio of liquid droplets containing no light-emitting particle relative to all the liquid droplets discharged, the ratio being calculated based on the presence or absence of the light-emitting particle.

11. The discharging method according to claim 10,
wherein the calculating the average particle number comprises multiplying the average particle number by a number of all the liquid droplets discharged in the discharging, to count a number of light-emitting particles in all the liquid droplets discharged in the discharging.

12. The discharging method according to claim 11, further comprising when counting a number of non-light-emitting particles, mixing a suspension suspending the light-emitting particle at a known concentration and a suspension suspending at a known concentration, the non-light-emitting particles that do not undergo luminescence in response to irradiation of the light at a predetermined mixing ratio to prepare a mixture suspension,
wherein the calculating the average particle number comprises counting the number of light-emitting particles in all the liquid droplets discharged in the discharging during discharging of the liquid droplet of the mixture suspension and counting the number of non-light-emitting particles in all the liquid droplets discharged in the discharging based on the number of light-emitting particles counted and the mixing ratio.

13. The discharging method according to claim 12,
wherein the preparing comprises preparing the mixture suspension in a manner that the average particle number is 1 or greater but 2 or less.

14. The discharging method according to claim 10,
wherein the calculating the average particle number comprises calculating the ratio each time a new liquid droplet is discharged, again calculating the average particle number based on the ratio calculated, and multiplying the average particle number calculated again by a number of all the liquid droplets discharged in the discharging, to count a number of light-emitting particles in all the liquid droplets discharged in the discharging.

* * * * *